United States Patent Office 3,007,931
Patented Nov. 7, 1961

---

3,007,931
PRODUCTION OF UNSATURATED HETERO-CYCLIC NITROGEN BASES
Billy D. Simpson, Anton M. Schnitzer, and Raymond L. Cobb, Bartlesville, Okla., assignors to Phillips Petroleum Company, a corporation of Delaware
No Drawing. Filed Mar. 9, 1959, Ser. No. 797,856
6 Claims. (Cl. 260—283)

This invention relates to the preparation of unsaturated, heterocyclic nitrogen bases of the pyridine and quinoline series.

Many processes have been proposed for the preparation of unsaturated heterocyclic nitrogen compounds. One such method involves the condensation of ammonia with compounds containing carbonyl groups. The products obtained have wide utility, for example, as solvents, as intermediates in the preparation of dyes, ion-exchange resins, medicinals, rubber chemicals, etc. For example, alkyl substituted heterocyclic nitrogen bases can be dehydrogenated to alkenyl substituted heterocyclic nitrogen bases which can then be polymerized, either alone or with copolymerizable monomers to form valuable polymers, and the like.

It is an object of this invention to provide a method of producing heterocyclic nitrogen bases of the pyridine and quinoline series.

Other objects, features and advantages will be obvious to those skilled in the art having been given this disclosure.

According to this invention, heterocyclic nitrogen bases of the pyridine and quinoline series are produced by contacting a nitrile having the structure

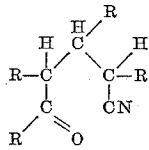

with a dehydrogenation catalyst under dehydrogenation and dehydrating conditions at a temperature in the range 100 to 750° C. The starting compounds for the preparation of the organic bases according to the process herein disclosed can be represented by the structure

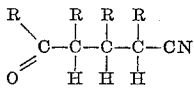

wherein each R group represents a hydrogen or a hydrocarbon radical having preferably 1 to 10, inclusive, carbon atoms and wherein R groups on any two adjacent carbon atoms can be hydrocarbon radicals which together with the said two adjacent carbon atoms form 5- and 6-membered carbocyclic rings. These compounds are herein broadly designated as nitriles, and the commonly preferred nitriles are compounds having 5 to 34 carbon atoms per molecule.

Among the nitriles useful in this invention are: 4-cyanobutyraldehyde; 4-methyl-5-oxoheptanenitrile; 4,6-dimethyl-5-oxoheptanenitrile; 5-oxopentadecanenitrile; 2-decyl-4-cyanobutyraldehyde; 2-vinyl-4-cyanobutyraldehyde; 5-(cycloocta-2,7-dienyl)-5-oxopentanenitrile; 2-(propyne-2)-4-cyanobutyraldehyde; 1-(2-cyanoethyl)-3-ethylheptyl phenly ketone; 4-(2-naphthyl)-5-oxohexanenitrile; 2-(2-cyanoethyl)cyclopentanone; 2-(2-cyanoethyl)cyclohexanone; 2-hexyl-3-octyl-5-oxotetradecanenitrile; 2-propyl-3-ethyl-5-oxoheptadecanenitrile; 2,3-dioctyl-5-oxotetradecanenitrile; 2,3-didecyl-5-oxotetradecanenitrile; 3-(2-cyanocyclohexyl)-2-propanone; 3-(2-cyanocyclohexyl)-2-octanone; 2-(2-cyanocyclohexyl)cyclohexanone; and 2-(2-cyanocyclopentyl)cyclopentanone.

When the R groups of the above defined nitriles are dehydrogenatable alkyl radicals or when the compounds contain dehydrogenatable alicyclic radicals they may or may not undergo such dehydrogenation during the course of the ring closure reaction, depending upon the severity of reaction conditions. Frequently mixtures of the two possible products are obtained from the process, i.e., by dehydrogenation of the alkyl radicals or the alicyclic radicals attached to a portion of the heterocyclic molecules. This is illustrated by the three equations below which illustrate the products produced from these reactants:

(Equation 1)

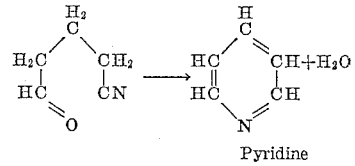

Pyridine (Equation 2)

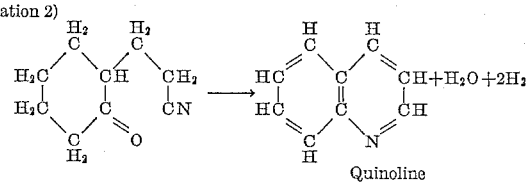

Quinoline (Equation 3)

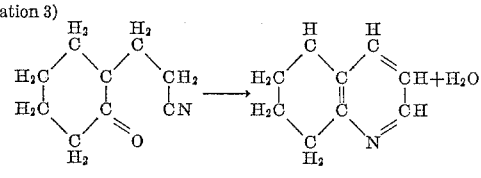

5,6,7,8-tetrahydroquinoline

The above-described nitriles are converted to the organic bases by contacting with a catalyst at a temperature in the range of 100 to 750° C., more preferably 150 to 500° C. The catalysts which have been found useful are those described as solid dehydrogenation catalysts.

The dehydrogenation catalysts most generally employed are transition metals or metal oxides of Group IV–A, V–A, VI–A and VIII of the Periodic Table according to Mendeleeff. Examples of such metals include titanium, vanadium, tantalum, chromium, molybdenum, tungsten, iron, cobalt, nickel, palladium, and platinum, and the oxides thereof. These transition metals or their oxides are generally present in an amount in the range 0.1 to 10 weight percent on a carrier of relatively low catalytic activity such as aluminum oxide and magnesium oxide. Promoters such as chromium oxide and potassium carbonate are commonly employed in the preparation of these catalysts. The metal catalysts are frequently formed by reduction of the metal oxide in a hydrogen atmosphere so that the metal has a high specific surface area. These catalysts are commonly employed in porous beds formed by chips or pellets of the catalyst.

Details relating to the preparation of such catalysts are well known, e.g., Berkman, Morrell, Egloff, "Catalysis," chaper 4, pages 222–306; Reinhold Publishing Corporation (1940); U.S. Patent 2,404,140 and U.S. Patent 2,414,585.

In the practice of this invention, the nitriles are contacted with the catalyst while in the liquid or the vapor phase, or a combination liquid and vapor phase, so as to effect conversion of the nitrile to the desired nitrogen-containing base. The reaction pressure can be conveniently atmospheric pressure; however, lower and higher pressures are applicable. Thus, vapor phase process is conveniently effected by passing vapors of the nitrile through the catalyst chamber at a pressure on the order of 1 to 10 millimeters. Higher pressures, e.g., 2 to 40 atmospheres, are sometimes desirable to maintain the reactants substantially all in the liquid phase while operating at temperatures above the boiling point at one atmosphere of the nitrile and the products.

The reaction can be effected batch-wise or continuously. In batch operations, the catalyst is used in amounts generally from 0.02 to 5 percent by weight of the nitrile. The catalyst and nitrile are charged to the reactor, mixed and the mixture heated to the desired temperatures. In continuous processes, the nitrile in the liquid state, gaseous state or combination liquid and gaseous state is generally heated and passed through a bed of the catalyst; however, moving or fluid bed technique can be employed.

Generally, the residence time will be from about 0.1 second to 100 hours. For continuous processes, the liquid space velocity per unit volume of catalyst per hour is preferred in the range of about 0.01 to 100.

It is within the scope of this invention to employ a suitable diluent which remains essentially unchanged. Suitable diluents include nitrogen, helium, methane, ethane, steam, benzene and toluene. Build-up in the partial pressure of hydrogen is readily avoided by venting the off-gas. The vented gas can be treated to recover valuable by-products such as hydrogen and ammonia.

The nitrogen bases can be separated from the reaction mixture in any convenient method. One method which is particularly applicable with quinoline and permits recycling of unreacted material involves neutralizing the mixture by addition of a dilute aqueous solution of a mineral acid such as hydrochloric acid or sulfuric acid at concentrations of 1 to 10 N. The organic base becomes soluble in the aqueous phase. If the acidification is effected in the presence of an organic solvent such as ethyl ether, unreacted material is dissolved in the organic phase. After separation of the organic phase, such compounds dissolved therein can be recovered.

The acidic aqueous phase is then nuetralized with alkali such as ammonia, lime, sodium carbonate or sodium hydroxide. Neutralization to a pH of 9 to 11 is generally effective so that the organic base separates as an oily layer. The oil can be separated from the aqueous layer and, if desired, further purified. Purification can be accomplished by extraction, crystallization, distillation and other well known procedures.

The following examples further illustrate the practice of this invention.

EXAMPLE I

Preparation of quinoline

The reactor consisted of an 18 mm. Pyrex tube about 38 cm. long which was surrounded by a tubular furnace. A 10 ml. catalyst bed (about 5 centimeters deep) was supported on chips of clay plate. The bottom of the catalyst bed was approximately 6 cm. from the bottom of the reactor. On top of the catalyst bed there was placed a 13 cm. depth of the clay plate to serve as a preheat section of the reactor. The inlet to the reactor was via a side tube entering at the top. The tube led to a bellows-type pump. The feed, 2-(-cyanoethyl)cyclohexanone, could be metered through the pump. The volume of feed could be ascertained by changes in level in the feed reservoir. The bottom of the reactor terminated in a constricted tube about 1 cm. in diameter. This tube fed the reaction products to the receiver. The receiver was also connected to a Dry-Ice trap where volatile by-products were condensed. The temperature of the catalyst and the preheater section was measured by means of thermocouples which were inserted in a 4 mm. Pyrex well located along the axis of the reactor.

The catalyst with which the reactor was charged was a commercial product supplied in the form of ⅛ inch tablets. The catalyst contained 0.5 percent by weight of palladium on alumina. Before use, the catalyst was heated in air at 300° C. and then reduced in a stream of hydrogen at a temperature of 350° C.

For this run 15.5 grams of 2-(2-cyanoethyl)cyclohexanone was fed to the reactor gradually over a 60 minute interval. The feed was then terminated and heating of the reactor continued for another 45 minutes. The preheater temperature during the run varied between 246 and 260° C. The catalyst bed temperature was 260 to 290° C. The product which collected in the receiver was mixed with 150 ml. ether and washed with two portions (25 ml. for each) of 6 N HCl to remove basic material. The acid solution was washed with 50 ml. ether and then neutralized to a pH of about 10 with 10 percent aqueous sodium hydroxide. An oil fraction containing the quinoline separated. This oil was extracted with three 25 ml. portions of ether and the ether extract was dried over anhydrous magnesium sulfate. Evaporation of the ether resulted in an approximately 10 percent loss of material due to foaming. The residue consisted of 8.1 grams of a light yellow liquid from which there separated 0.3 gram of a white solid which was found to have a melting point of 165 to 166° C.

The oily liquid was identified as comprising quinoline from the melting point of the picrate derivative. The picrate was prepared by adding approximately 0.5 ml. of the oil to 15 ml. of a saturated solution of picric acid in ethanol. The picrate separated immediately and was recovered by filtration. It was recrystallized twice from ethanol. The melting point was 202 to 204° C. as compared with a reported value of 203° C. The yield of oily product is calculated to be 50 percent by weight of the reactant.

EXAMPLE II

Preparation of 2-ethyl-3-methylpyridine

A run was made substantially as stated for Example I except as otherwise stated. The reactor was charged with the catalyst located at the bottom of the reactor tube so as to form a bed about 9 cm. deep. No clay tile was used in the reactor.

The reactor was maintained at a temperature of 197 to 210° C. while 14.86 grams of 4-methyl-5-oxoheptanenitrile was fed through the catalyst bed over a period of 115 minutes.

The products (11.37 grams) collected in the receiver were treated by the proceduce described in Example I. The oily material, 2-ethyl-3-methylpyridine, was used to prepare the picrate derivative which had a melting point of 138 to 139° C. The value reported [Journal of American Chemical Society 79, 1669 (1957)] for this picrate derivative is 138 to 140° C. The yield, calculated as 2-ethyl-3-methylpyridine, was 10 percent by weight of the reactant.

EXAMPLE III

Preparation of quinoline

A run similar to that described in Example I was made except that the reactor temperature was maintained between 204 and 215° C. Over a 120 minute period there was fed 28.8 grams of 2-(2-cyanoethyl)cyclohexanone. Heating of the reactor was continued for 60 minutes. There was collected 27.3 grams of product in the receiver.

The product was treated as stated for Example I. There was obtained 6.7 grams of oily liquid. The ether extracts yielded 27.3 grams of material which qualitatively appeared to be largely the unreacted starting material.

EXAMPLE IV

Five runs were made substantially as stated for Example I except that the catalyst bed temperature was in the range of 200 to 260° C. The oily products from the several runs were combined and distilled under vacuum. From an initial distillation the higher boiling fractions having a refractive index, $n_D^{20}$, between 1.5733 and 1.6076 were combined to give a composite sample having a volume of about 10 ml. This composite sample was redistilled under pressure of 35 to 37 mm. of mercury absolute and at a reflux ratio of 60 to 1. Seven fractions were obtained and the last fraction amounting to about 15% by weight of the charge had a boiling point of 126° C. at a pressure of 35 mm. The refractive index, $n_D^{20}$, of this fraction was 1.6238 as compared with a value of 1.6283 as reported for quinoline. Portions of this last fraction were taken and derivatives were prepared as summarized in the tabulation below. In this tabulation a comparison is made between the melting points found for the derivatives and the values reported in the literature. Since the values found agree very closely with those reported, the presence of quinoline appears to be very well established.

| Quinoline Derivative | Melting Point, ° C. | |
| --- | --- | --- |
|  | Found | Literature [1] |
| Picrate | 203–204 | 203 |
| 3,5-dinitrobenzoate | 150–152 | 152 |
| Methiodide | 72.5–73 | 72 |

[1] Reported by Cheronis and Entrikin, "Semimicro Qualitative Analysis," page 410. T. Y. Crowell Co., New York (1947).

The low-boiling fractions from the above described first distillation which had a refractive index, $n_D^{20}$, of 1.5483 to 1.5520 were also combined to give a composite sample having a volume of approximately 10 ml. This composite was distilled at a pressure in the range of 18 to 34 mm. of mercury to yield 7 fractions. The third fraction representing about 1/10 of the charge had a boiling point of 117° C. at a pressure of 31.4 mm. and a refractive index, $n_D^{20}$, of 1.5433 as compared with a reported value of 1.54257 for 5,6,7,8-tetrahydroquinoline. The fact that this sample comprised the tetrahydroquinoline was further proved with the preparation of derivatives as shown in the tabulation below:

| Derivative | Melting Point, ° C. | | Reference |
| --- | --- | --- | --- |
|  | Found | Literature |  |
| Picrate | 159–160 | 158 | (a) |
| Chloroplatinate | 212–213 | 212.5–213 | (b) |
| Chloroaurate | 137–138 | 138.5–139 | (b) | a Chemical Abstracts 40, 1835 (1946).
b Chemical Abstracts 29, 471 (1935).

We claim:
1. A process for preparing pyridine and quinoline compounds which comprises contacting under dehydrogenation conditions a nitrile having up to 34 total carbon atoms per molecule and having the structural formula

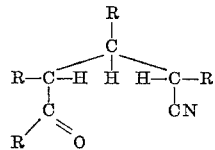

wherein R is selected from the group consisting of hydrogen, alkyl and aryl radicals having 1 to 10 carbon atoms, inclusive, and carbon atoms which together with two adjacent carbon atoms in said formula form 5- and 6-membered carbocyclic rings, with a dehydrogenation catalyst selected from the group consisting of the metals and metal oxides of titanium, vanadium, tantalum, chromium, molybdenum, tungsten, iron, cobalt, nickel, palladium and platinum at a temperature in the range 100 to 750° C.

2. Process according to claim 1 wherein the catalyst is supported and is present in an amount ranging from 0.1 to 10 weight percent of the catalyst made.

3. Process according to claim 2 wherein the catalyst is palladium.

4. Process according to claim 3 wherein the support is alumina.

5. A process for preparing quinoline compounds which comprises contacting 2-(2-cyanoethyl)cyclohexanone under dehydrogenation conditions with a palladium-alumina dehydrogenation catalyst at a temperature in the range of 150 to 500° C.

6. A process for preparing pyridine compounds which comprises contacting 4-methyl-5-oxoheptanenitrile under dehydrogenation conditions with a palladium-alumina dehydrogenation catalyst at a temperature in the range of 150 to 500° C.

References Cited in the file of this patent
UNITED STATES PATENTS
2,184,235    Groll et al. _____ Dec. 19, 1939

OTHER REFERENCES
Bayer: Angewante Chemie, vol. 61, No. 6 (1949), page 237.